United States Patent
Gopalan et al.

(10) Patent No.: US 11,088,784 B1
(45) Date of Patent: Aug. 10, 2021

(54) SYSTEMS AND METHODS FOR UTILIZING DYNAMIC CODES WITH NEURAL NETWORKS

(71) Applicant: Aira Technologies, Inc., Saratoga, CA (US)

(72) Inventors: RaviKiran Gopalan, Cupertino, CA (US); Anand Chandrasekher, Saratoga, CA (US); Yihan Jiang, Cupertino, CA (US)

(73) Assignee: Aira Technologies, Inc., Saratoga, CA (US)

(*) Notice: Subject to any disclaimer, the term of this patent is extended or adjusted under 35 U.S.C. 154(b) by 0 days.

(21) Appl. No.: 17/133,921

(22) Filed: Dec. 24, 2020

(51) Int. Cl.
*H04L 1/00* (2006.01)
*G06N 3/08* (2006.01)
*G06N 3/04* (2006.01)
*H04L 1/20* (2006.01)

(52) U.S. Cl.
CPC ......... *H04L 1/0075* (2013.01); *G06N 3/0454* (2013.01); *G06N 3/08* (2013.01); *H04L 1/20* (2013.01)

(58) Field of Classification Search
CPC ....... H04L 1/0075; H04L 1/20; G06N 3/0454; G06N 3/08
USPC .......................................................... 370/464
See application file for complete search history.

(56) References Cited

U.S. PATENT DOCUMENTS

| | | | |
|---|---|---|---|
| 5,968,197 A | 10/1999 | Doiron | |
| 10,749,594 B1 | 8/2020 | O'Shea et al. | |
| 2002/0026523 A1 | 2/2002 | Mallory et al. | |
| 2002/0122510 A1 | 9/2002 | Yakhnich et al. | |
| 2004/0170120 A1 | 9/2004 | Reunamaki et al. | |
| 2006/0047862 A1 | 3/2006 | Shearer et al. | |
| 2006/0268996 A1* | 11/2006 | Sethi | H04N 19/895 375/240.27 |
| 2009/0086711 A1 | 4/2009 | Capretta et al. | |
| 2011/0206019 A1 | 8/2011 | Zhai et al. | |

(Continued)

FOREIGN PATENT DOCUMENTS

GB 2493081 A 1/2013

OTHER PUBLICATIONS

Kim et al., "Deepcode: Feedback Codes via Deep Learning," [online] Jul. 2, 2018 [retrieved on Apr. 17, 2020], Retrieved from the Internet: < URL:https://arxiv.org/abs/1807.00801v1>, 24 pages.
Gopalan et al., "Systems and Methods for Artificial Intelligence Discovered Codes", U.S. Appl. No. 17/069,794, filed Oct. 13, 2020, Specification, Claims, Abstract, and Drawings, 43 pages.

(Continued)

*Primary Examiner* — Michael R Neff
(74) *Attorney, Agent, or Firm* — Carr & Ferrell LLP

(57) ABSTRACT

Systems and methods for utilizing dynamic codes in a dynamic system comprising neural networks are disclosed. In an exemplary embodiment, training data is transmitted to an encoder block, the encoder block having an encoder neural network. Training data is encoded utilizing the encoder neural network of the encoder block, and then decoded by a decoder block, the decoder block having a decoder neural network. An end-end error is determined by comparing the training data that was transmitted to the encoder block against the decoded training data that was received from the decoder block. Encoder/decoder parameters to minimize the end-end error are optimized and transmitted. Upon receipt of the encoder/decoder parameter updates, the encoder block and the decoder block are initialized.

25 Claims, 11 Drawing Sheets

(56) References Cited

U.S. PATENT DOCUMENTS

| | | | |
|---|---|---|---|
| 2011/0216787 A1 | 9/2011 | Ai et al. | |
| 2014/0241309 A1 | 8/2014 | Hilton et al. | |
| 2016/0006842 A1 | 1/2016 | Tahir | |
| 2018/0013808 A1 | 1/2018 | Petry et al. | |
| 2018/0101957 A1 | 4/2018 | Talathi | |
| 2018/0314985 A1* | 11/2018 | O'Shea | G06N 3/0454 |
| 2019/0037052 A1 | 1/2019 | Deshpande | |
| 2019/0097914 A1 | 3/2019 | Zhong et al. | |
| 2019/0392266 A1* | 12/2019 | Zhong | G06K 9/00335 |
| 2019/0393903 A1* | 12/2019 | Mandt | G06N 3/0454 |
| 2020/0128279 A1 | 4/2020 | Han et al. | |
| 2020/0177418 A1 | 6/2020 | Hoydis et al. | |
| 2020/0320371 A1 | 10/2020 | Baker | |
| 2020/0383169 A1 | 12/2020 | Takahashi et al. | |
| 2021/0014939 A1 | 1/2021 | Verzun et al. | |
| 2021/0034846 A1 | 2/2021 | Ko et al. | |
| 2021/0056058 A1 | 2/2021 | Lee et al. | |

OTHER PUBLICATIONS

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yarnarnoto-Itoh coding scherne to discrete rnernoryless broadcast channels." 2017 IEEE International Symposium on Information Theory (ISIT). IEEE, 2017, 5 pages.

Aoudia et al., "End-to-end learning of communications systems without a channel model." 2018 52nd Asilornar Conference on Signals, Systems, and Computers. IEEE, Dec. 5, 2018, 6 pages.

Duman et al., "On optimal power allocation for turbo codes." Proceedings of IEEE International Symposium on Information Theory. IEEE, Jun. 29-Jul. 4, 1997, 1 page.

Arvinte et al., "Deep log-likelihood ratio quantization." 2019 27th European Signal Processing Conference (EUSIPCO). IEEE, 2019, 5 pages.

* cited by examiner

SYSTEMS AND METHODS FOR UTILIZING DYNAMIC CODES WITH NEURAL NETWORKS

CROSS-REFERENCE TO RELATED APPLICATIONS

This application is related to U.S. patent application Ser. No. 17/069,794 filed on Oct. 13, 2020, entitled "Systems and Methods for Artificial Intelligence Discovered Codes." The disclosure of the above-referenced application is incorporated by reference herein in its entirety for all purposes.

TECHNICAL FIELD

This disclosure pertains to the technical field of telecommunications, and more particularly, but not by way of limitation, to systems and methods for utilizing dynamic codes for neural networks.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Systems and methods for utilizing dynamic codes in a dynamic system comprising neural networks are disclosed. In an exemplary method embodiment, training data is transmitted to an encoder block, the encoder block having an encoder neural network. Training data is encoded utilizing the encoder neural network of the encoder block, and then decoded by a decoder block, the decoder block having a decoder neural network. An end-end error is determined by comparing the training data that was transmitted to the encoder block against the decoded training data that was received from the decoder block. Encoder/decoder parameters to minimize the end-end error are optimized and transmitted. Upon receipt of the encoder/decoder parameter updates, the encoder block and the decoder block are initialized.

A dynamic system for utilizing dynamic codes is also disclosed. The dynamic system comprises an encoder block having an encoder neural network, a decoder block having a decoder neural network, and a back-end processing unit. The back-end processing unit comprises a processor and a memory for storing instructions, the processor executing the instructions stored in memory to transmit training data, the training data comprising a known sequence of bits, to an encoder block, such that the encoder block encodes the training data utilizing the encoder neural network and the training data is decoded by a decoder block utilizing the decoder neural network; determine an end-end error by comparing the training data that was transmitted to the encoder block against the decoded training data that was received from the decoder block; optimize encoder/decoder parameters to minimize the end-end error, transmit the encoder/decoder parameter updates to the encoder neural network and decoder neural network of the encoder block and the decoder blocks, respectively, and upon receipt of the encoder/decoder parameter updates by the encoder neural network and decoder neural network, dynamically initialize the encoder block and the decoder block.

BRIEF DESCRIPTION OF THE DRAWINGS

Embodiments are illustrated by way of example, and not by limitation in the figures of the accompanying drawings, in which like references indicate similar elements.

DETAILED DESCRIPTION

Figure 1:
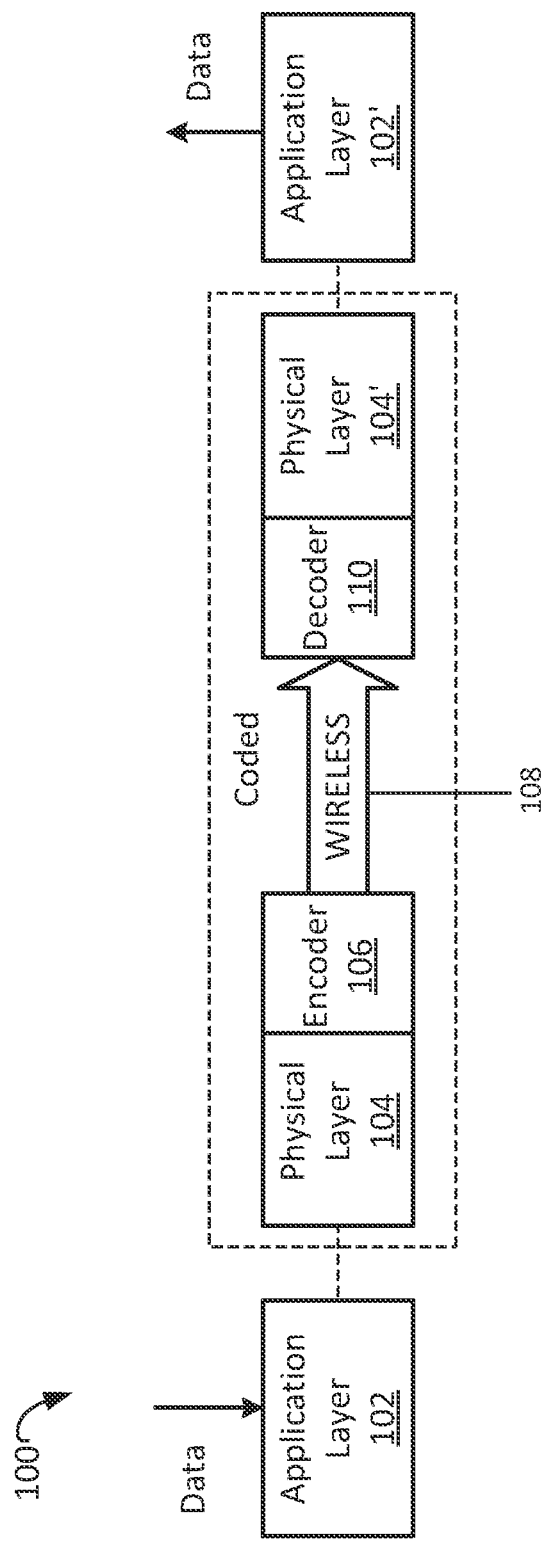
FIG. 1 is an architectural block diagram of a static environment for utilizing static codes that are implemented in the physical layer of the OSI model.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

Generally, the embodiments described herein pertain to the technical field of telecommunications, and more particularly, but not by way of limitation, to systems and methods for utilizing dynamic codes in neural networks.

Traditionally, static codes, such as forward error correcting codes (FEC), have been used by communications systems to correct errors that are introduced during wired or wireless transmissions. One skilled in the art will recognize that wired and wireless transmissions include technologies such as Wi-Fi, Bluetooth, Cellular, and the like. The FEC is encoded into information bits and transmitted by a transmitter encoder to a receive decoder. The receive decoder can decode the FEC and perform a Cyclic Redundancy Check (CRC) check on the packet to determine if the packet has been received without errors. When CRC fails on a packet the transmitter encoder is asked to re-transmit the failed packet.

Static codes, such as FEC, are implemented typically at the physical layer, which is the lowest layer, of the Open System Interconnection (OSI) seven-layer architectural stack model (hereinafter referred to as the "OSI model"). Unfortunately, because traditional static codes are typically located in the physical layer of the OSI model, these static codes are inflexible and rather limited in their practical applications for wired and wireless transmissions alike.

Specifically, static codes cannot react nor respond to dynamically changing connection settings by virtue of the codes being static. Static codes cannot be changed or modified on-the-fly. Instead, static codes are typically implemented in firmware (as opposed to software), and static codes are heavily based on mathematics. For example, static codes like FEC are based on mathematical, linear code, and therefore cannot incorporate feedback since one cannot use linear code to incorporate feedback. Hence, implementing static codes at the physical layer of the OSI model makes them difficult to modify, thereby making it virtually impossible for such static codes to respond to any changes, alterations, additions, or any type of modifications in the connection or in the environment as a whole. In sum, static codes cannot incorporate feedback, they are inflexible, and static codes cannot be easily modified.

To address these issues that are presented by traditional static codes, the present technology provides systems and methods for utilizing dynamic codes (also referred to herein as "dynamic feedback codes" or "feedback codes") in the context of a neural network structure. In exemplary embodiments, dynamic codes can be implemented at the application layer, rather than at the physical layer, of the OSI model. By implementing them at the application layer, these codes are now modifiable in response to any changes, alterations, additions, or any other type of modifications in one or more connections (links) or even in the system as a whole.

For example, these dynamic codes can be dynamically upgraded based on the actual performance of the channel. In some exemplary embodiments, these codes that are implemented at the application layer can be upgraded on a per link basis to provide security. Also, such dynamic codes are self-learning about their environment and can adapt, which is further described in greater detail in related U.S. patent application Ser. No. 17/069,794 filed on Oct. 13, 2020, entitled "Systems and Methods for Artificial Intelligence Discovered Codes," which is incorporated by reference herein in its entirety for all purposes.

Furthermore, for general wireless communications, by implementing the dynamic codes in the application layer, error correction for that protocol is enhanced several-fold. Further details about the enhanced error correction using dynamic codes are provided later herein. The present technology allows one to achieve the same or better reliability in comparison to traditional communication systems, but with lower energy costs. Thus, energy efficiency and reliability are increased by virtue of the embodiments as described herein.

Referring back to traditional static codes, FIG. 1 is an architectural block diagram of a static system 100 for utilizing static codes that are implemented in the physical layer of the OSI model. Specifically, FIG. 1 depicts a static physical-layer based encoding/decoding architecture for a static system that is typically used with static codes, such as FEC. FIG. 1 shows that in this static system 100, the data enters the coded channel by way of an application layer 102 to a physical layer 104. The processes of coding and decoding of the data that is being transmitted occur in the lowest layer (the physical layer 104, 104') of the OSI model. The various aspects located at the physical layer 104, 104' are coded and fixed in firmware. In the channel, data is encoded and later decoded, respectively, by an encoder 106 and a decoder 110, respectively. The encoded data is transmitted from the encoder 106 through a communications link (connection) 108 to the decoder 110 for decoding. To be sure, noise can occur during this transmission at the communications link 108, such that errors can be produced, and such errors can appear or otherwise negatively impact the data packets that are ultimately decoded. Finally, after being decoded by the decoder 110, in this static system 100, the data exits by way of a physical layer 104' and an application layer 102'.

As mentioned earlier, the problems inherent with the traditional static environment system are a result of the static codes in physical layer 104, 104' being coded and fixed in firmware. As such, the static codes cannot be modified or dynamically changed on-the-fly. The static codes are inflexible to changes in connection settings, in the immediate environment (indoors or outdoors), or in the static system 100 as a whole.

Figure 2:
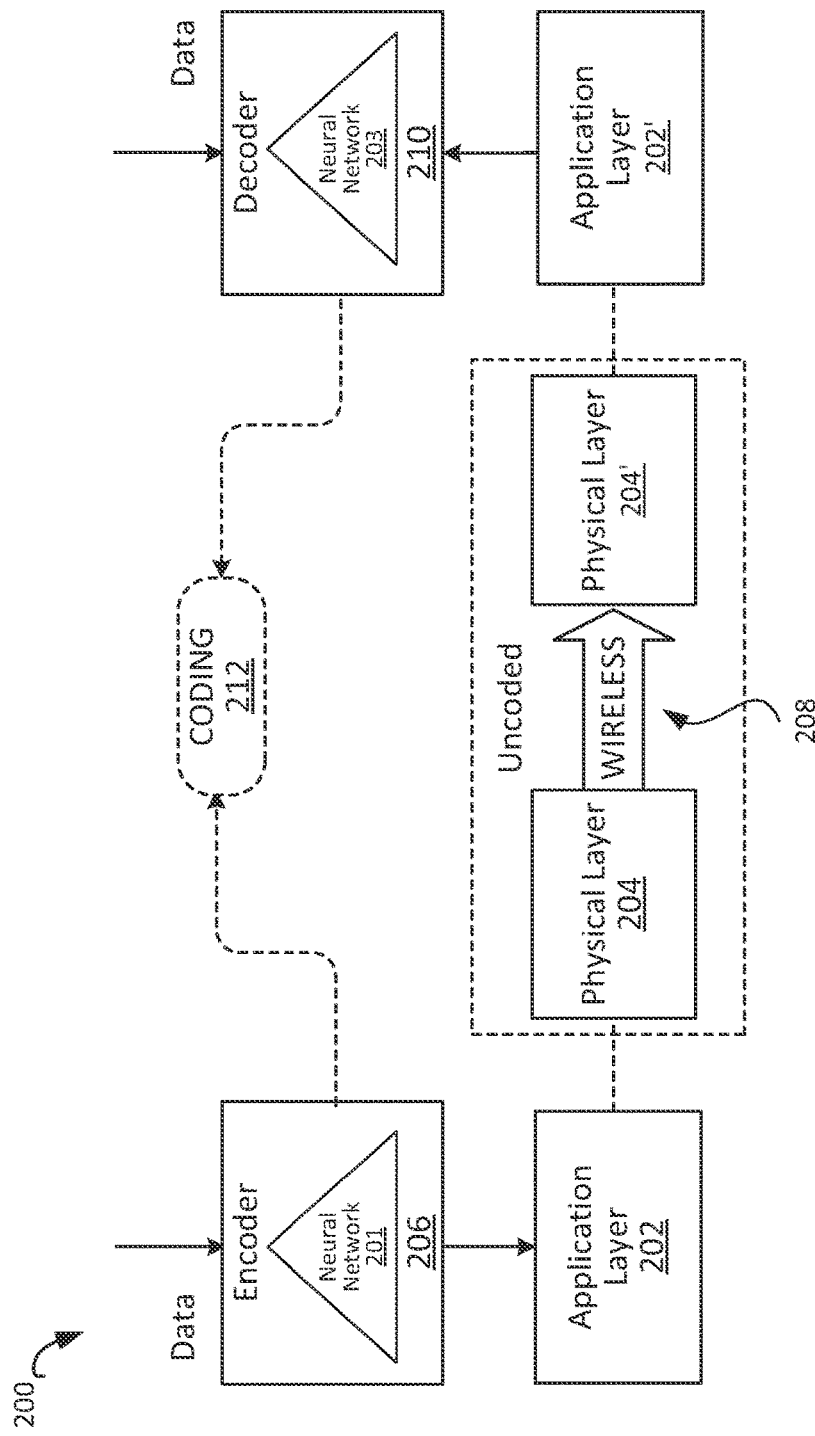
FIG. 2 is an architectural block diagram of an exemplary environment for utilizing dynamic feedback codes that are implemented in the application layer of the OSI model.

Now turning to FIG. 2, FIG. 2 is an architectural block diagram of an exemplary dynamic system 200 for utilizing dynamic codes that are implemented in the application layer of the OSI model. Specifically, FIG. 2 depicts a dynamic application layer based encoding/decoding architecture for a dynamic system 200. In this dynamic system 200, the data enters via an application layer 202 and a physical layer 204. Unlike in FIG. 1, FIG. 2 shows that the processes of coding and decoding of the data occur in the application layer 202, 202' of the OSI model. One important aspect of certain embodiments of the present disclosure is that coding of the data, which is typically done at the physical layer, is moved into the application layer, which allows for the codes to be easily modified dynamically. The advantage of using dynamic codes is that the codes are not static. Thus, instructions in software for the dynamic processes of coding and decoding the data to be transmitted can be executed by a computer processor.

Referring back to FIG. 2, data is coded and later decoded, respectively, by an encoder 206 and a decoder 210 at the application layer 202, 202', respectively, with the help of a coding module 212. As will be explained later herein, the coding module 212 may include a back-end processing block. The coding module 212 may generate the dynamic codes as described herein. Each of the encoder 206 and the decoder 210 are realized as programmable neural networks in the application layer 202, 202'. The encoder 206 is realized with an encoder neural network 201, while the decoder 210 is realized with a decoder neural network 203.

As used herein, the encoder 206 is also referred to as the "encoding block" or the "encoding module." Likewise, the decoder 210 is also referred to herein as the "decoding block" or the "decoding module."

As a result of the dynamic codes in this dynamic system 200, and in particular as a result of the programmable structures provided by the encoder neural network 201 and the decoder neural network 203, the encoding block 206 and decoding block 210 are dynamically initializable and upgradable via a back-end monitoring system, which will be discussed later herein in reference to FIGS. 5 and 6. Hence, flexible, modifiable dynamic codes can be generated and updated with the help of this dynamic system 200.

It will be appreciated that although FIG. 2 describes the dynamic system 200 as including various modules and blocks, fewer or more modules and blocks may be included in the dynamic system 200 and still fall within the scope of various embodiments. Additionally, various modules and blocks of the dynamic system 200 may be combined into a single module or block.

Once the data is coded with dynamic codes with the help of the coding module 212, the encoded data passes through the application layer 202 and the physical layer 204. The encoded data is further transmitted via wireless connection (link) 208 to the physical layer 204' and the application layer 202'. Once the data appears at the application layer 202', then the data is sent to the decoder 210 for decoding, with the help of the programmable structure of the decoder neural network 203. Once the data has been decoded, and a loss function is applied to the decoded bits, parameter updates can be sent to the encoder neural network 201, such that the encoder neural network 201 can be optimized to calculate a forward error correcting code. This FEC can be dynamic and modified on-the-fly.

The dynamic codes described herein can be dynamically modified by using a programmable neural network structure (such as the structure provided in the encoder neural network and the decoder neural network) and also by programming appropriate parameters based on the connection settings. In some embodiments, the neural network can be a fully connected neural network (FCNN) or a recurrent neural network (RNN), although one skilled in the art will recognize that any type of neural network can be implemented with the present technology. In accordance with some of the embodiments of the present technology, encoder/decoder parameters can be modified on an on-going basis by monitoring the connection quality of the data transmission. The programming of the appropriate parameters will be discussed in greater detail later herein.

Figure 3:
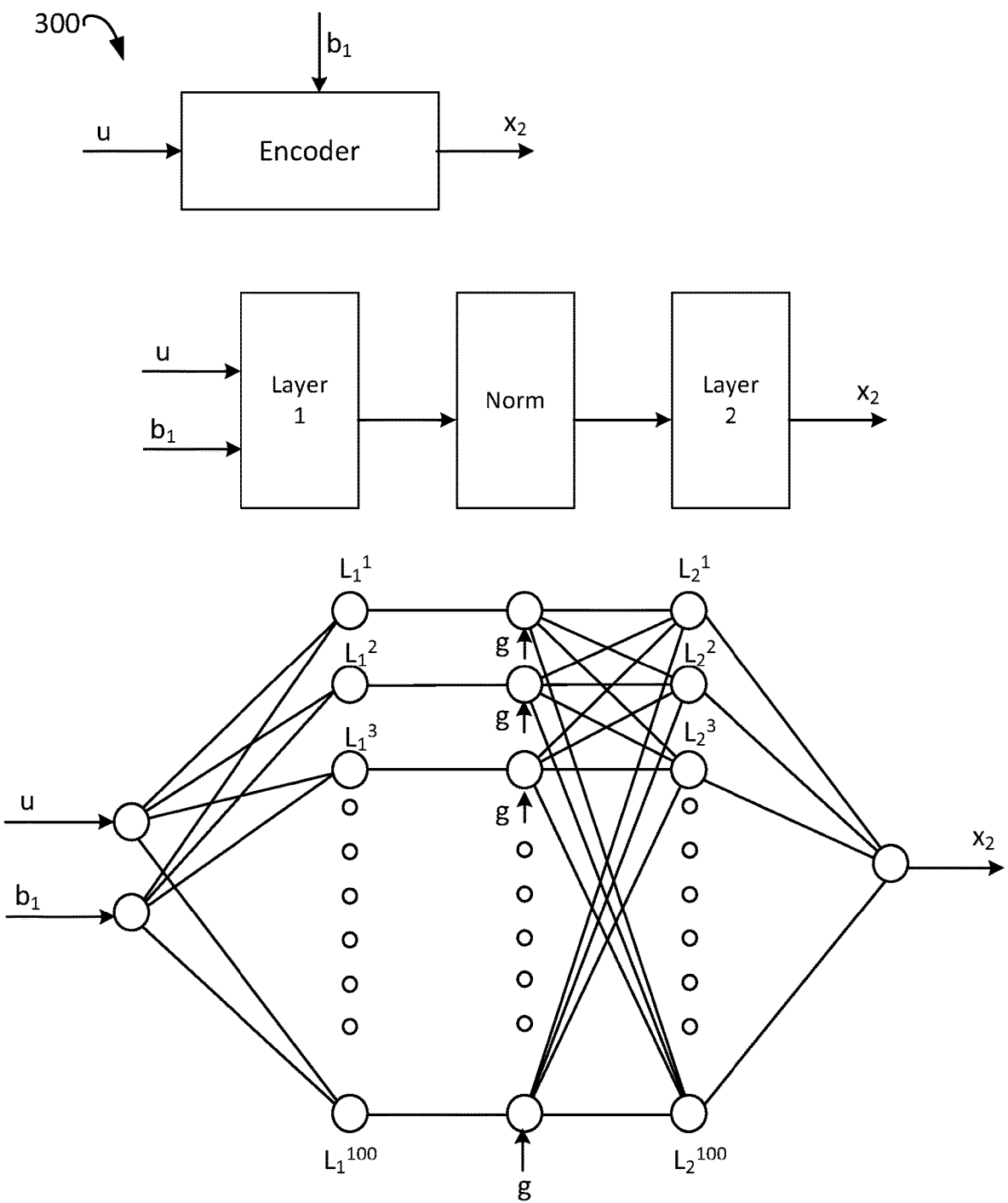
FIG. 3 depicts an exemplary neural network which can be realized in a fully connected neural network (FCNN) environment.

For purposes of understanding the neural networks used in a dynamic system, an example construct of a neural network 300 is illustrated in FIG. 3. The neural network 300 is a fully connected neural network. In general, the neural network 300 receives as input variables U and bits $B_1$. These variables and bits are passed into a layer, such as Layer 1. Each connection in a layer can be weighted. The weighting of each connection in a layer can be optimized via gradient descent, as an example. While two layers are illustrated, the neural network 300 can comprise any number of layers. Also, the transmit encoder can implement a normalization function Norm between Layer 1 and Layer 2, as an example. The neural network 300 is comprised of a plurality of connections, such as nodes that are associated with a layer. For example, nodes $[L_1^1, L_1^2, L_1^3 L_1^{100}]$ belong to Layer 1. Each connected node is provided with a weight. The neural network 300 iterates over the weights of the nodes. As the weighting of the nodes change, the resulting FEC produced by the neural network 300 changes.

The parameters/variables that are processed by the neural network 300 can include any of the information bits $I_b$, the encoded bits $TE_b$, the received samples $R_s$, and the decoded bits Db. Using a loss function and one or more constraints, the weights assigned to each of the variables can be adjusted over time to improve the FEC generated by the neural network 300. For example, after variables are initiated with weighting, the resulting FEC can be optimized by adjustment of the variable weighting and subsequent calculation of loss function, such as the Hamming distance. The training of the neural network 300 results in a shrinking of the Hamming distance, to converge at an error rate that is close to, or actually zero. To be sure, the neural network 300 iterates over the parameters noted above, attempting to converge at the smallest possible error rate. Also, it will be understood that some variable values and weights change over time. For example, received samples $R_s$, and the decoded bits Db may vary based on change in noise or other factors. Again, the outcome is to produce an optimized FEC, illustrated as $X_2$.

Figure 4:
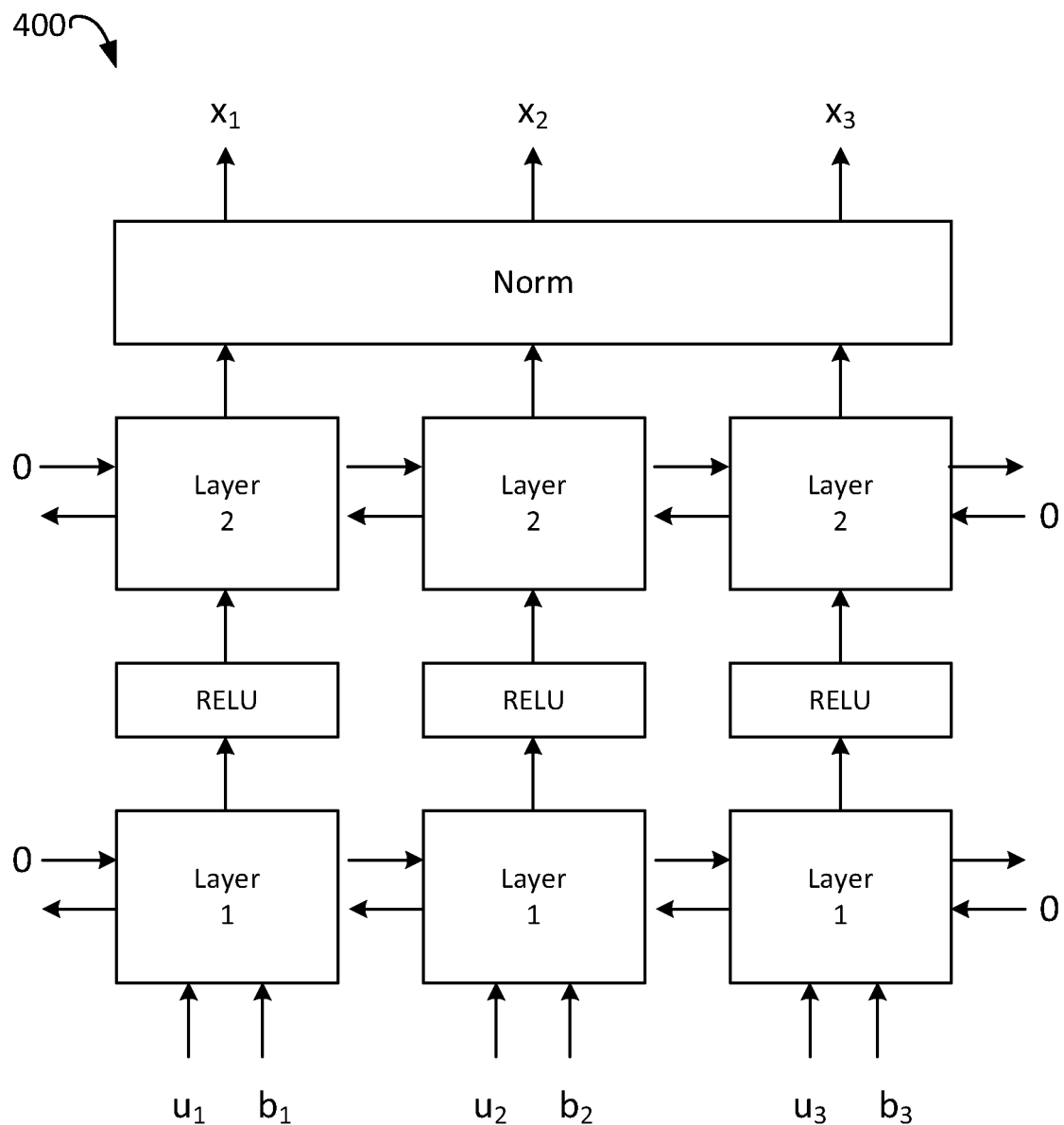
FIG. 4 depicts an exemplary neural network which can be realized in a recurrent neural network (RNN) environment.

FIG. 4 illustrates an example schematic representation of a neural network 400 that can be used in place of the encoder neural network 201 or the decoder neural network 203 of FIG. 2. The neural network 400 is a recursive neural network (RNN). The neural network 400 is comprised of various layers, such as Layer 1 and Layer 2 blocks. The Layer 1 blocks receive multiple inputs, U1/B1, U2/B2, etc., comprising of variables (such as variables U1 or U2) and bits (such as bits B1 or B2). Variables and bits processed by the Layer 1 blocks are fed into rectified linear unit "RELU" blocks. The output of the RELU blocks is fed into Layer 2 blocks for further processing. To be sure, the neural network 400 can include any number of layer blocks and RELU blocks, with the output of the final set of Layer blocks feeding into a normalization "Norm" function to generate aspects of the FEC $[X_1, X_2, X_3]$. One skilled in the art will recognize that the structure presented in FIG. 4 is similar for both the encoder and decoder blocks. Further details regarding the recursive neural network as depicted in FIG. 4 can be found in related U.S. patent application Ser. No. 17/069,794 filed on Oct. 13, 2020, entitled "Systems and Methods for Artificial Intelligence Discovered Codes," which is incorporated by reference herein in its entirety for all purposes.

It will be understood by one skilled in the art that both the encoder neural network 201 and the decoder neural network 203 in FIG. 2 can be constructed using, for example, any of the constructs of FIG. 3 or 4, for implementing a fully connected neural network or a recursive neural network. Again, while these example types of neural networks have been disclosed, other neural networks can also be utilized.

Figure 5:
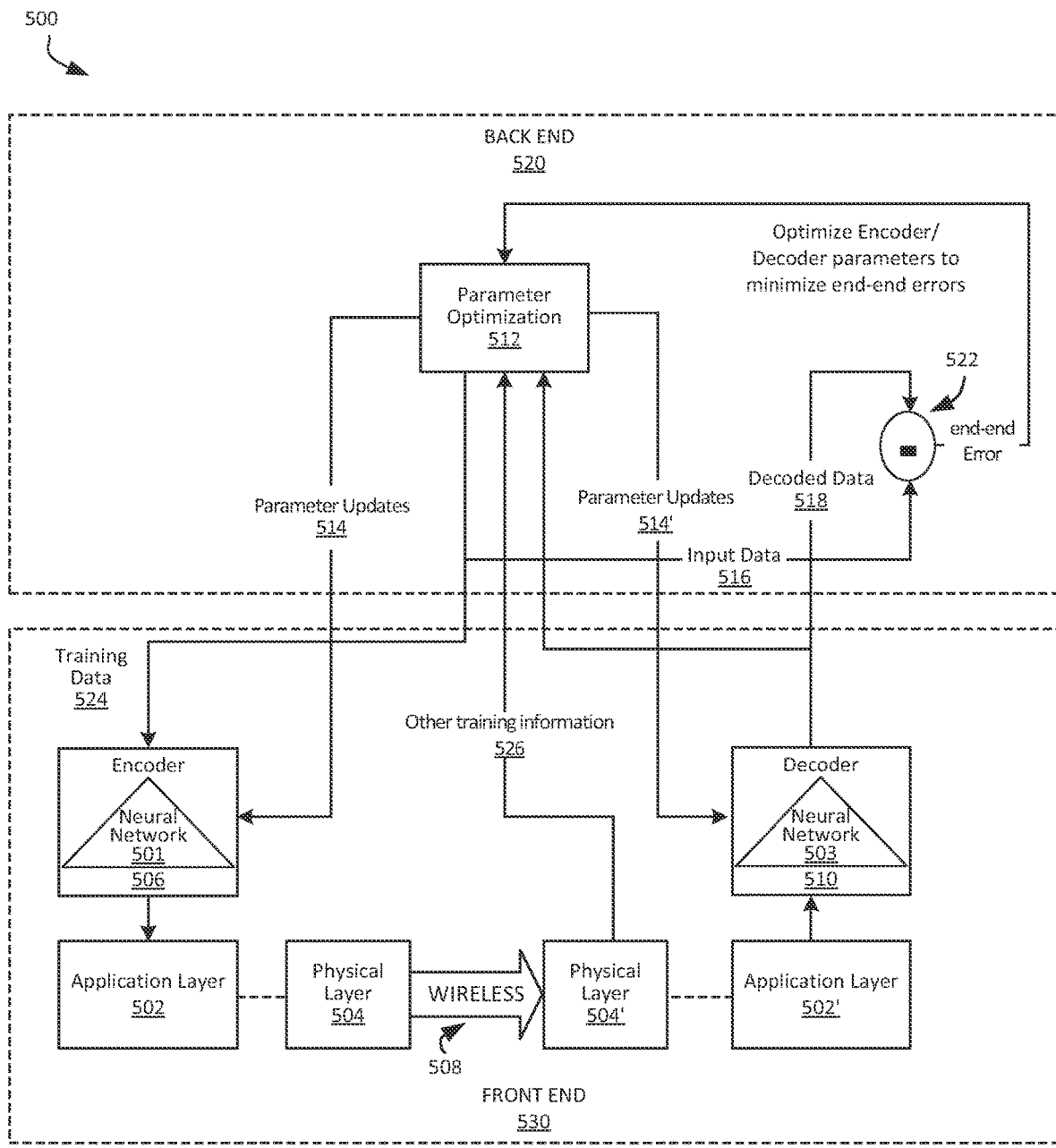
FIG. 5 is a schematic depicting initialization of an exemplary dynamic system.

FIG. 5 illustrates an exemplary methodology for initializing a dynamic system 500. As depicted in FIG. 5, the dynamic system 500 comprises a front end 530 and a back end 520. In some embodiments of the present disclosure, the dynamic system 500 in FIG. 5 includes the dynamic system 200 depicted in FIG. 2 as part of the front end 530. The back end 520 may include a parameter optimization module 512. Further information about the parameter optimization module 512 (also known as the "parameter optimization block" herein) can be found later herein.

During the initialization phase of the dynamic system 500, the encoding block 506 and the decoding block 510 are initialized using random weights. The processing and monitoring that occurs at the back end 520 (hereinafter called "back-end processing") of the dynamic system 500 generates training data 524. The training data 524 comprises a known sequence of bits that is passed through an encoding block 506 and then later transmitted through an application layer 502, 502' and a physical layer 504 and 504' and ultimately received by the decoding block 510 for decoding, through an uncoded wireless system or connection (link) 508. From the physical layer 504', other training information 526 may be transmitted to the parameter optimization module 512 to help train and optimize the parameters of the encoding block 506 and the decoding block 510.

The uncoded wireless system 508 can either be a simulated system or a real system. The uncoded wireless system 508 may introduce noise which may cause the decoding block 510 to produce errors in decoding the data. Because the training data 524 that is sent and received is known, an end-end error 522 can be observed. That is, the difference between the training sequence (input data 516) and the decoded sequence (output data 518) is considered to be the end-end error 522 in the scheme.

The end-end error 522 is observed and determined in order to optimize encoder/decoder neural network parameters such that parameter updates 514 and 514', respectively, are produced and transmitted to the neural networks in both the encoding block 506 and the decoding block 510, respectively. Such neural network parameters are utilized in the neural networks that are realized in the encoding block 506 and the decoding block 510. The neural network in the encoding block 506 is called the encoder neural network 501. The neural network in the decoding block 510 is called the decoder neural network 503.

The back-end processing by the back end 520 may be offline and may be accomplished in the cloud. The back-end processing may be accomplished by a back-end processing unit or system, in conjunction with the parameter optimization module 512, to observe error patterns, compute appropriate parameters or choose from appropriate set of parameters and then update the parameter values accordingly.

The back-end processing by the back end 520 is configured to generate multiple epochs and batches of training data 524 to optimize the neural network parameters in the encoding block 506 and the decoding block 510, such as to affect and/or minimize the end-end error 522. In other words, the neural network parameters in the encoding block 506 and the decoding block 510 are modified such that the resulting end-end error 522 is minimized. The end-end error 522 may be considered as the quality of the link or the quality of the connection that is being observed by the back-end processing.

At this point, a loss function may be determined in view of the end-end error 522. Then, the process of optimizing neural network parameters may transform into a closed loop. In this closed loop, the neural network parameters continue to be processed and updated by the back-end processing and the parameter optimization module 512, as the scheme of the dynamic system 500 approaches a lower end-end error 522. That is, the neural network parameters of the encoder 506 and decoder 510 can be modified or optimized based on the observation of the end-end error 522 by the back-end processing unit.

Once the back-end processing converges such that the end-end error is substantially minimized, the encoding block 506 and the decoding block 510 of the dynamic system 500 are said to be initialized. Once data has been decoded by the decoding block 510, and a loss function is applied to the decoded bits, parameter updates can be sent to the encoder neural network 501, such that the encoder neural network 501 can be optimized to calculate a forward error correcting code. This FEC can be dynamic and modified on-the-fly.

As with all the systems and methods described herein, the system depicted in FIG. 5 may be performed by one or more modules in the dynamic system 500. Additionally, steps of the methodology depicted in FIG. 5 may be performed in varying orders or concurrently. Furthermore, various steps may be added, removed, or combined in the methodology and still fall within the scope of the present invention.

Figure 6:
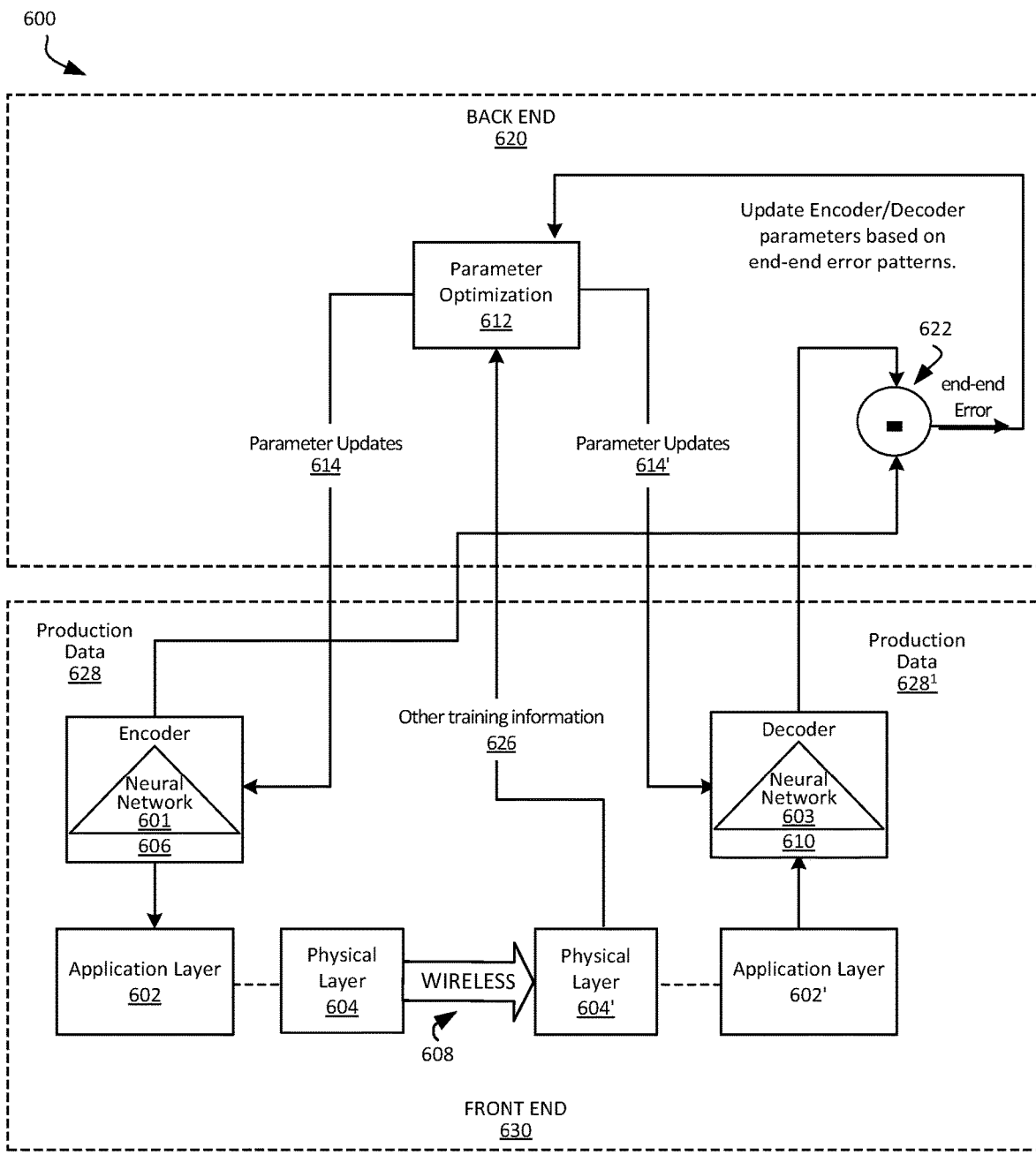
FIG. 6 is a schematic depicting an updating of an exemplary dynamic system.

FIG. 6 is a schematic depicting an updating of an exemplary dynamic system 600. Once the dynamic system 600 is initialized, which was described earlier in the description concerning FIG. 5, the dynamic system 600 can be utilized for transmitting and receiving production data 628, 628'. The systems 500 and 600, respectively, in FIGS. 5 and 6, respectively, have similar system components. However, the system conditions in production in FIG. 6 may be different from the conditions under which the system was optimized in FIG. 5.

Also, the system conditions in production as shown in FIG. 6 can vary with time. It is helpful to modify certain rates based on errors observed by the dynamic system 600. Where a rate is varying, the dynamic system 600 in FIG. 6 is useful to update parameters for the encoder block and the decoder block based on end-end errors patterns which can be determined by observing end-end errors 622. For instance, if a user is currently on an existing wireless link and the dynamic system 600 detects that the user is moving away such that the user is on the verge of losing the wireless link, the dynamic system 600 can update the rate code such that the wireless link itself can become stronger and the wireless link is not lost for the user.

Another example where system conditions in production can vary with time is the scenario where a user may see that their cell phone battery has decreased such that their cellular phone battery is about to expire. Utilizing the dynamic system 600 of FIG. 6, the dynamic system 600 can detect that the battery is about to expire, and the dynamic system 600 can update the rate to be more energy efficient, thereby placing the user's cellular phone battery into a power-saving mode.

Similar to that of the dynamic system 500 of FIG. 5, the dynamic system 600 of FIG. 6 comprises a front end 630 and a back end processing unit 620. The back end processing unit 620 may include a parameter optimization module 612, which is similar to the parameter optimization module 512 in FIG. 5. Further information about the parameter optimization module (also known as the "parameter optimization block" herein) was described earlier in conjunction with FIG. 5.

During the updating phase of the dynamic system 600, the processing that occurs at the back end (hereinafter called "back-end processing") by the back end processing unit 620 of the dynamic system 600 updates the encoder and decoder parameters based on end-end error 622 patterns. The back end processing unit 620 can include the parameter optimization module 612. The back end processing unit 620 can observe end-end errors 622 patterns in the dynamic system 600 and can continue updating the neural network parameters of the encoding block 606 and the decoding block 610 in order to minimize the end-end errors 622. Such parameter updates 614, 614', respectively, are transmitted to the encoding block 606 and the decoding block 610, respectively, by the parameter optimization module 612. Such neural network parameters are utilized in the neural networks that are realized in the encoding block 606 and the decoding block 610.

The production data 628 is passed through the encoding block 606 and then later transmitted through the application layer 602, 602' and physical layer 604 and 604' and ultimately received by the decoding block 610 for decoding, through an uncoded wireless system 608. From the physical layer 604', other training information 626 may be transmitted to the parameter optimization module 612 to help update the parameters of the neural networks found in the encoding block 606 and the decoding block 610 in order to reduce the end-end error patterns by observing the values of end-end error 622.

Because the production data 628 received by the encoder 606 can be compared against the production data 628' received from the decoder 610, an end-end error 622 can be observed. That is, the difference between the training input production data 628 and the decoder output production data 628' is considered to be the end-end error 622 in this dynamic system 600.

The back-end processing in FIG. 6 may be offline and may be accomplished in the cloud. The back-end processing may be accomplished in conjunction with the parameter optimization module 612 to observe error patterns, compute appropriate parameters or choose from appropriate set of parameters and then update the parameter values accordingly.

The back-end processing is configured to generate multiple epochs and batches of production data 628 to update the neural network parameters in the encoding block 606 and the decoding block 610, such as to affect and/or minimize the end-end error patterns. In other words, the neural network parameters in the encoding block 606 and the decoding block 610 are modified in response to the resulting end-end error patterns. The neural network parameters of the encoder 606 and decoder 610 can be updated based on this observation of the end-end error 622 patterns. Once the data has been decoded by the decoder 610, and a loss function is applied to the decoded bits, parameter updates can be sent to the encoder neural network 601, such that the encoder neural network 601 can be optimized to calculate a forward error correcting code. This FEC can be dynamic and modified on-the-fly.

As with all the systems and methods described herein, the system depicted in FIG. 6 may be performed by one or more modules in the dynamic system 600. Additionally, steps of the methodology in FIG. 6 may be performed in varying orders or concurrently. Furthermore, various steps may be added, removed, or combined in the methodology and still fall within the scope of the present invention.

Figure 7:
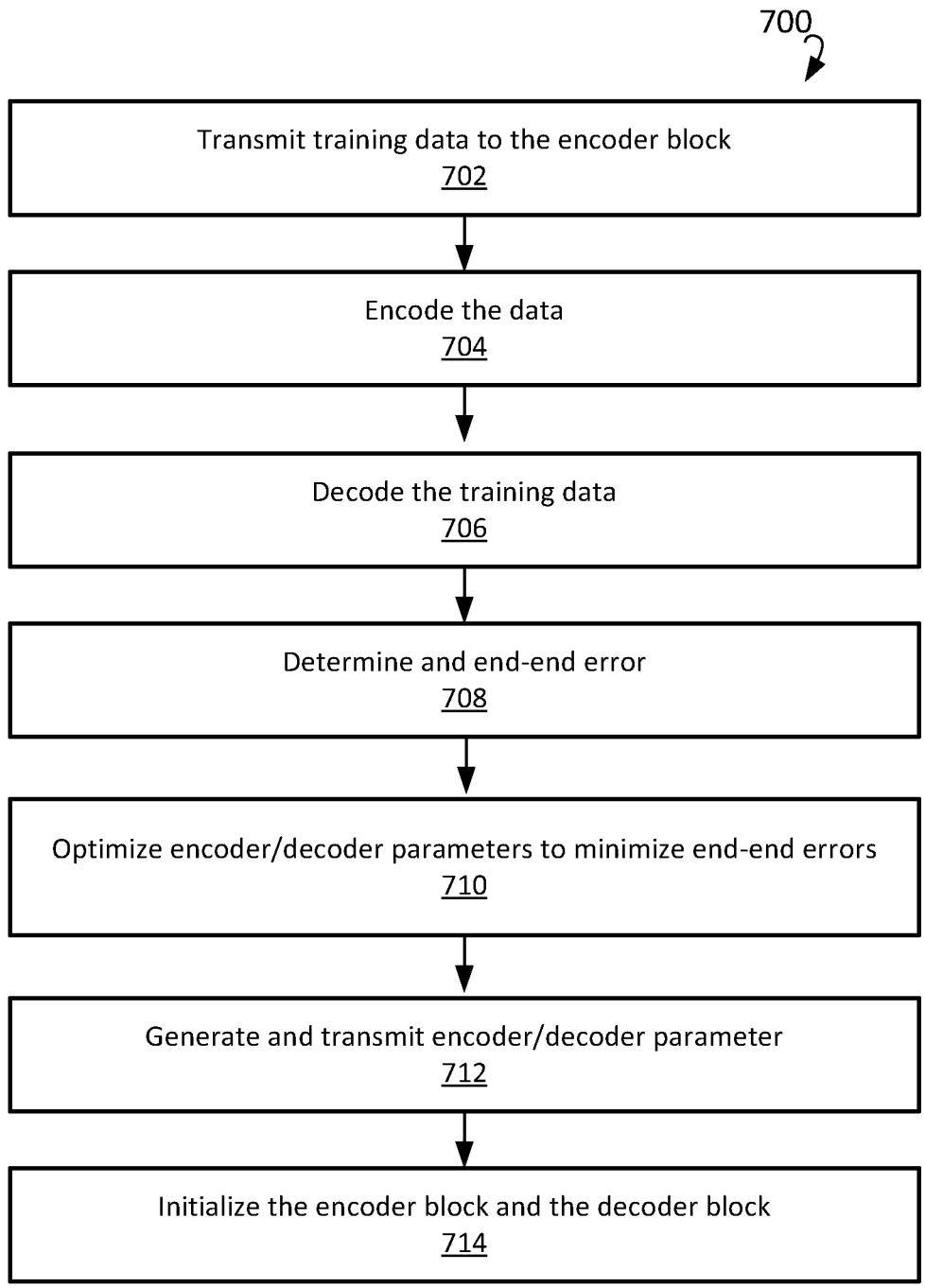
FIG. 7 is a flowchart of an example method of the present disclosure

FIG. 7 is a flowchart of a method 700 in accordance with embodiments of the present disclosure. At step 702, training data, which is a known sequence of bits, is transmitted to the encoder block. At step 704, data is encoded using the encoder neural network of the encoder block. At step 706, the training data is decoded using the decoder neural network by the decoder block. At step 708, an end-end error is determined by comparing the transmitted training data that was transmitted to the encoder block against the decoded training data that was received by the decoder block. At step 710, encoder/decoder parameters are optimized to minimize end-end errors that were determined. At step 712, when the end-end errors are minimized and the process converges, encoder/decoder parameter updates are generated and transmitted to the encoder block and the decoder blocks. At step 714, the encoder and decoder blocks are initialized with the parameter updates received by the parameter optimization module.

Figure 8:
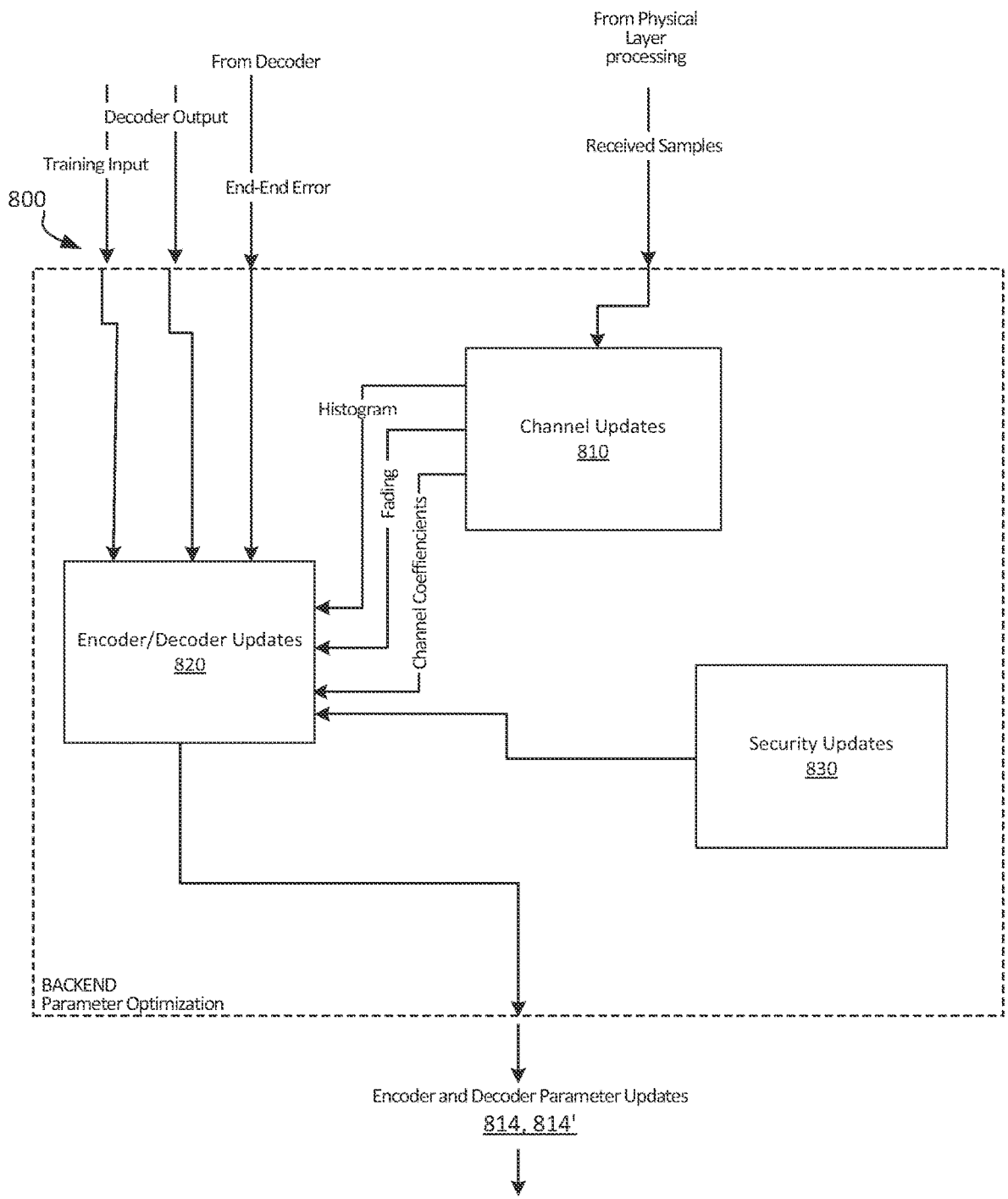
FIG. 8 is a schematic depicting an exemplary parameter optimization block (also known as the "parameter optimization module" herein) for updating parameters for encoders and decoders.

FIG. 8 depicts an exemplary parameter optimization module 800 configured for updating parameters for an encoder or a decoder, in accordance with certain embodiments of the present disclosure. FIG. 8 shows that the backend processing unit can comprise a parameter optimization module or block 800. The parameter optimization module 800 can be used as the parameter optimization module in any of the other figures described herein.

The parameter optimization module 800 is configured to provide neural network parameter updates for the encoder and decoder in the dynamic system. To accomplish this task, the parameter optimization module may comprise a channel updates module 810, an encoder/decoder updates module 820, and a security updates module 830. With the embodiments described herein for exemplary dynamic systems, since these modules are on the application layer, rather than the physical layer, each of these modules or blocks can be combined, stacked, designed jointly or otherwise coupled together, such as to derive energy efficiencies which are otherwise not available in traditional static systems.

Hence, from physical layer processing, received samples are transmitted to the channel updates module 810, which in turn provides the outputs of histogram, fading and channel coefficients to the encoder/decoder updates module 820. The security updates module 830 provides security updates to the encoder/decoder updates module 820. The encoder/decoder updates module 820 obtains training input, decoder output, and end-end error from the decoding block of the dynamic system. With all of these inputs, the encoder/decoder updates module 820 determines, modifies or otherwise adjusts encoder and decoder parameter updates 814, 814', respectively, as needed, to dynamically vary rates in time, as appropriate.

Figure 9:
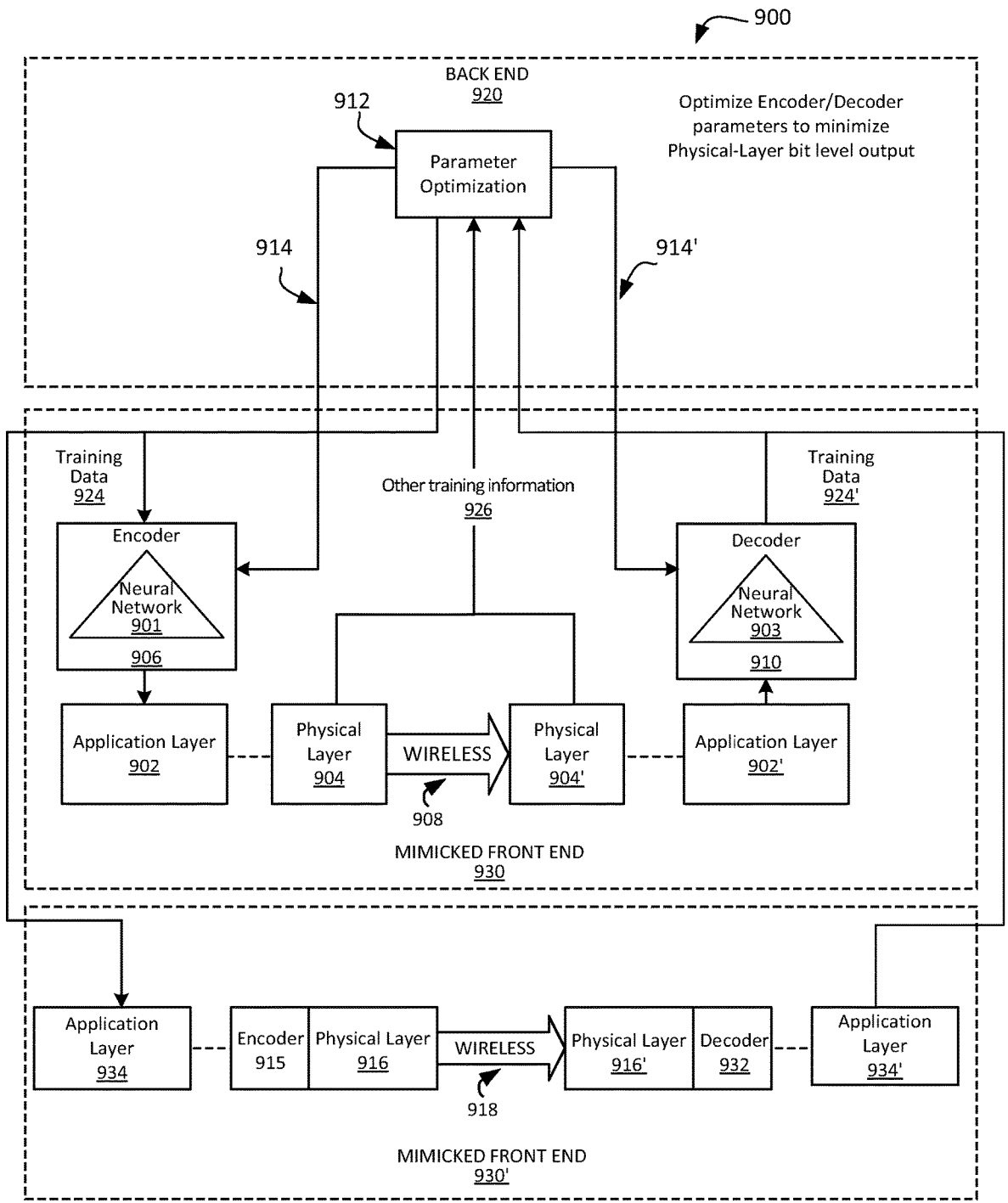
FIG. 9 is a schematic depicting mimicking while utilizing a dynamic system, in accordance with certain embodiments of the present disclosure.

FIG. 9 depicts an exemplary dynamic system 900 for mimicking a static code utilizing a dynamic architecture in accordance with some embodiments of the present disclosure. As shown in FIG. 9, the encoder/decoder settings can also be optimized to mimic an existing static physical layer code. This mimicking mode is useful if the dynamic encoder wants to interoperate with an existing static code-based decoder, or if a dynamic decoder wants to interoperate with an existing static code-based encoder.

The mimicking mode is ideal for those situations in which at least one device is not running a dynamic system, but is instead running a static system (such as the static system depicted in FIG. 1). In order to communicate with that device through telecommunications, one must mimic codes that the device can understand. Typically, if the device utilizes existing or conventional codes, such as a static code or any type of codes that are not based on neural networks, then the mimicking mode allows for one to provide mimicked codes that are codes which the device understands.

In a first example, assume that Device A and Device B are in active communications using dynamic codes. Device A now wants to communicate with Device C, which is not equipped with a dynamic code, but uses instead a static physical layer code. Device A can now transmit to Device C, by updating its encoder parameters to mimic the static physical layer code that is used by Device C.

In a second example, assume that Device A and Device B are in active communications using Dynamic codes. Device A wants to communicate with Device C, which is not equipped with a dynamic code, but uses a static physical layer code. Device A can now receive from Device C, by updating its decoder parameters to mimic the static physical layer code that is used by Device C.

As shown in FIG. 9, the dynamic system 900 comprises a front end 930 and a back end 920. The back end 920 may include a parameter optimization module 912. Further information about the parameter optimization module (also known as the "parameter optimization block" herein) can be found in the earlier descriptions herein.

In this mimicking mode with the dynamic system 900, the back end 920 of the dynamic system 900 generates training data 924, 924' to optimize neural network parameters such that parameter updates 914 and 914', respectively, are produced and transmitted to the encoding block 906 and the decoding block 910, respectively. Such neural network parameters are utilized in the neural networks that are realized in the encoding block 906 and the decoding block 910. The training data 924 comprises a known sequence of bits that is passed through the encoding block 906 and then later transmitted through the application layer 902, 902' and physical layer 904 and 904' and ultimately received by the decoding block 910 for decoding, through an uncoded wireless system 908. From the physical layer 904, 904', other training information 926 may be transmitted to the parameter optimization module 912 to help optimize the encoder/decoder parameters in order to minimize the physical-layer bit level output.

The uncoded wireless system 908 can either be a simulated system or a real system. The uncoded wireless system 908 may introduce noise which may cause the decoding block 910 to produce errors in decoding the data.

The back-end processing unit may be offline and may be accomplished in the cloud. The back-end processing unit may be accomplished in conjunction with the parameter optimization module 912 to observe error patterns, compute appropriate parameters or choose from appropriate set of parameters and then optimize the parameter values to minimize the physical-layer bit level output accordingly.

The mimicked front-end 930' provides a path where bits are transmitted through the application layer 934, 934', an encoder 915, a decoder 932 and physical layer 916 and 916' and are ultimately received by the parameter optimization module 912, through a wireless system 918.

As with all the systems and methods described herein, the system depicted in FIG. 9 may be performed by one or more modules in the dynamic system 900. Additionally, steps of the methodology in FIG. 9 may be performed in varying orders or concurrently. Furthermore, various steps may be added, removed, or combined in the methodology and still fall within the scope of the present invention.

Figure 10:
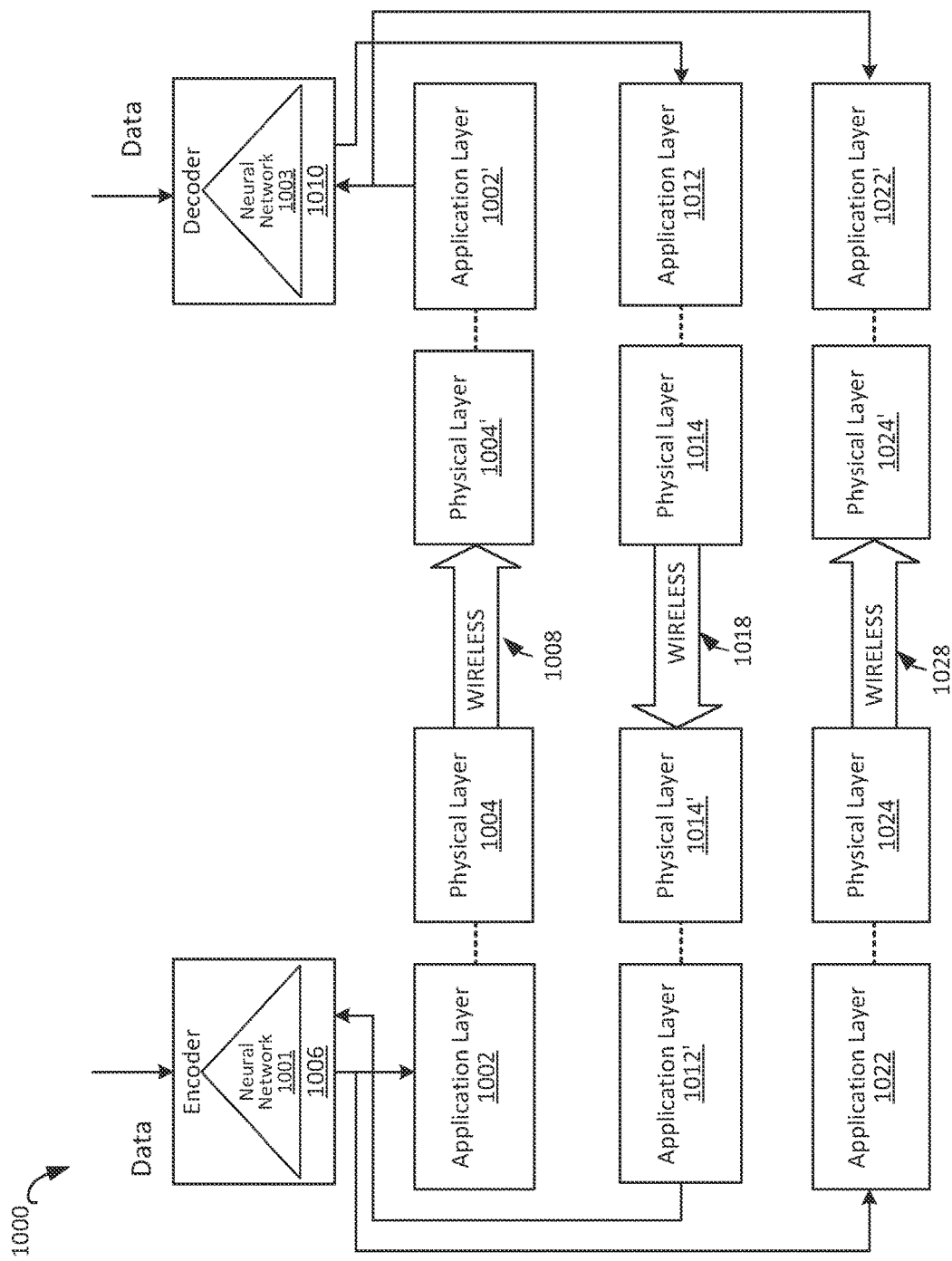
FIG. 10 is a schematic depicting a dynamic system in a multi-turn communications mode, in accordance with certain embodiments of the present disclosure.

FIG. 10 depicts an exemplary dynamic system 1000 for a multi-turn communications mode. In this dynamic system 1000, an encoder 1006 and a decoder 1010 are each realized in a neural network structure. The encoder 1006 has an encoder neural network 1001. The decoder 1010 has a decoder neural network 1003. Both the encoder 1006 and the decoder 1010 can also be optimized for a multi-turn communication mode. The multi-turn communication mode utilizes the feedback channel and is more energy efficient for small packets. Thus, instead of expanding the data stream for error correction, which is what is normally done, the multi-turn communication mode sends messages iteratively by using the knowledge of what was received by the receiver.

Since the codes are dynamic, the encoder/decoder parameters can now be modified by the back-end based on the turn-number. In other words, every turn of the multi-turn communications can use a different set of encoder/decoder parameters that have been optimized for optimal overall energy efficiency.

Referring now to FIG. 10, the dynamic system 1000 for a multi-turn communications as depicted shows three turns. However, one skilled in the art will appreciate that the present disclosure is not limited to three turns, and that the present disclosure allows for the number of turns in a multi-turn communications to be any whole number above the number 1.

In FIG. 10, input data enters the encoder 1006 and its encoder neural network 1001. The data passes through the encoding block 1006 and then later transmits through the application layer 1002, 1002' and physical layer 1004 and 1004' and ultimately receives by the decoding block 1010 and its decoder neural network 1003 for decoding, through a wireless system 1008. The multi-turn communication mode sends messages iteratively by using the knowledge of what was received by the receiver. Then, since the codes are dynamic, the encoder/decoder parameters can be modified by the back end processing unit at this first turn.

Then, after the encoder/decoder parameters are modified, such as to optimize the encoder 1006 and decoder 1010 after the first turn, the data passes through the application layer 1012, 1012' and physical layer 1014 and 1014' and ultimately received by the encoder 1006 with its encoder neural network 1001, through the wireless system 1018. Since the codes are dynamic, the encoder/decoder parameters can be modified by the back-end processing unit at this second turn.

Then, after the encoder/decoder parameters are modified, such as to optimize the encoder 1006 and decoder 1010 after the second turn, the data passes through the encoding block 1006 and then later transmits through the application layer 1022, 1022' and physical layer 1024 and 1024' and ultimately received by the decoding block 1010 for decoding, through a wireless system 1028. Since the codes are dynamic, the encoder/decoder parameters can be modified by the back end processing unit at this third turn.

Figure 11:
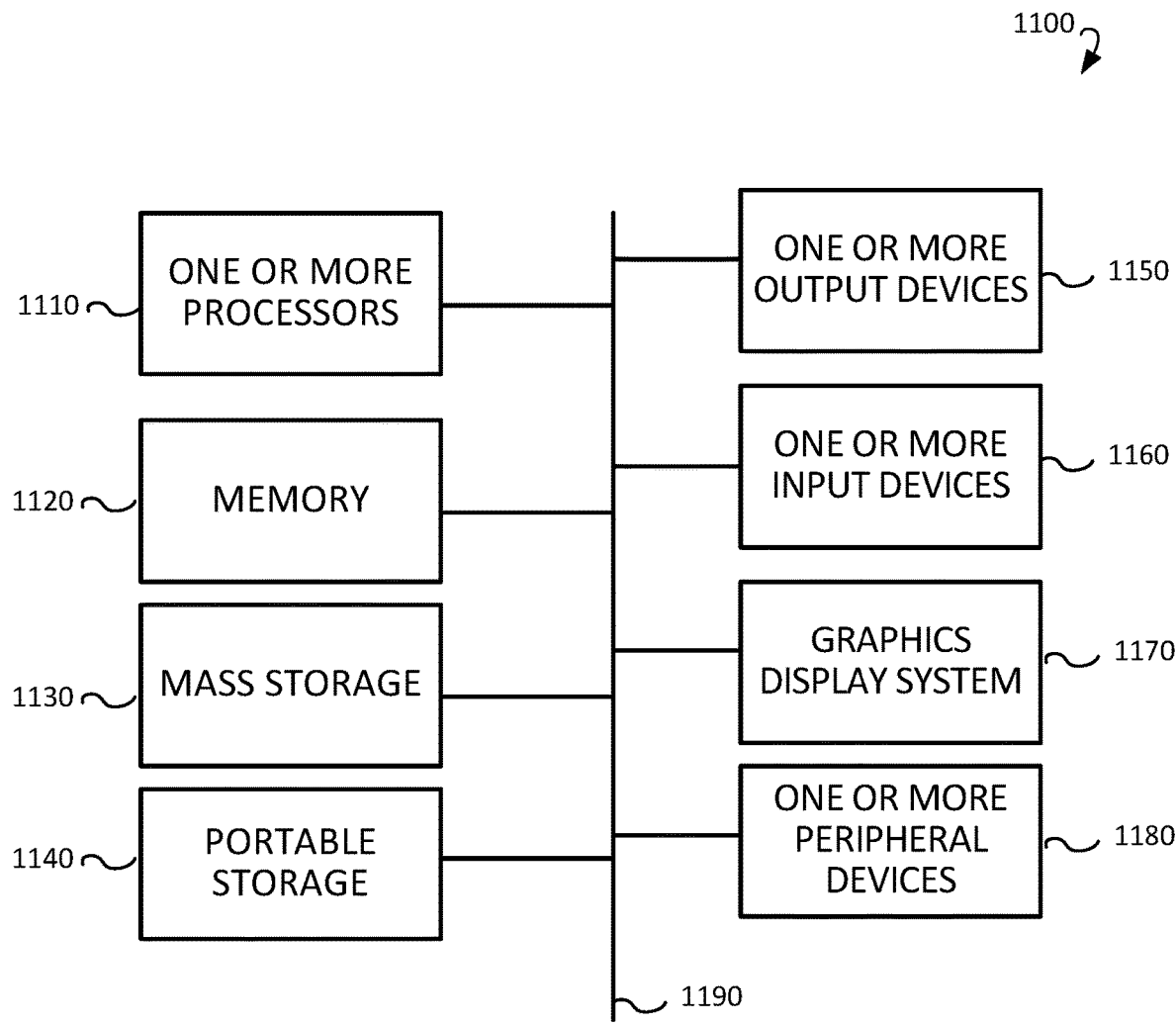
FIG. 11 depicts an exemplary computer system that may be used to implement embodiments of the present technology described herein.

FIG. 11 illustrates an exemplary computer system 1100 that may be used to implement some embodiments of the present invention. The computer system 1100 in FIG. 11 may be implemented in the contexts of the likes of computing systems, networks, servers, or combinations thereof. The computer system 1100 in FIG. 11 includes one or more processor unit(s) 1110 and main memory 1120. Main memory 1120 stores, in part, instructions and data for execution by processor unit(s) 1110. Main memory 1120 stores the executable code when in operation, in this example. The computer system 1100 in FIG. 11 further includes a mass data storage 1130, portable storage device 1140, output devices 1150, user input devices 1160, a graphics display system 1170, and peripheral device(s) 1180.

The components shown in FIG. 11 are depicted as being connected via a single bus 1190. The components may be connected through one or more data transport means. Processor unit(s) 1110 and main memory 1120 are connected via a local microprocessor bus, and the mass data storage 1130, peripheral device(s) 1180, portable storage device 1140, and graphics display system 1170 are connected via one or more input/output (I/O) buses.

Mass data storage 1130, which can be implemented with a magnetic disk drive, solid state drive, or an optical disk drive, is a non-volatile storage device for storing data and instructions for use by processor unit(s) 1110. Mass data storage 1130 stores the system software for implementing embodiments of the present disclosure for purposes of loading that software into main memory 1120.

Portable storage device 1140 operates in conjunction with a portable non-volatile storage medium, such as a flash drive, floppy disk, compact disk, digital video disc, or Universal Serial Bus (USB) storage device, to input and output data and code to and from the computer system 1100 in FIG. 11. The system software for implementing embodiments of the present disclosure is stored on such a portable medium and input to the computer system 1100 via the portable storage device 1140.

User input devices 1160 can provide a portion of a user interface. User input devices 1160 may include one or more microphones, an alphanumeric keypad, such as a keyboard, for inputting alphanumeric and other information, or a pointing device, such as a mouse, a trackball, stylus, or cursor direction keys. User input devices 1160 can also include a touchscreen. Additionally, the computer system 1100 as shown in FIG. 11 includes output devices 1150. Suitable output devices 1150 include speakers, printers, network interfaces, and monitors.

Graphics display system 1170 include a liquid crystal display (LCD) or other suitable display device. Graphics display system 1170 is configurable to receive textual and graphical information and processes the information for output to the display device.

Peripheral device(s) 1180 may include any type of computer support device to add additional functionality to the computer system.

Some of the components provided in the computer system 1100 in FIG. 11 can be those typically found in computer systems that may be suitable for use with embodiments of the present disclosure and are intended to represent a broad category of such computer components. Thus, the computer system 1100 in FIG. 11 can be a personal computer (PC), hand held computer system, telephone, mobile computer system, workstation, tablet, phablet, mobile phone, server, minicomputer, mainframe computer, wearable, or any other computer system or IoT device/system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1100 may be implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1100, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or a personal area network (PAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Thus, methods and systems for utilizing dynamic codes with neural networks are disclosed. Although embodiments have been described with reference to specific example embodiments, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for utilizing dynamic codes in a dynamic system comprising neural networks, the method comprising:
   transmitting training data, the training data comprising a known sequence of bits, to an encoder block, the encoder block having an encoder neural network;
   encoding the training data utilizing the encoder neural network of the encoder block;
   decoding the training data by a decoder block, the decoder block having a decoder neural network;
   determine an end-end error by comparing the training data that was transmitted to the encoder block against the decoded training data that was received from the decoder block;
   optimizing encoder/decoder parameters to minimize the end-end error;
   transmitting encoder/decoder parameter updates to the encoder neural network and decoder neural network of the encoder block and the decoder block, respectively; and
   upon receipt of the encoder/decoder parameter updates, dynamically initializing the encoder block and the decoder block, wherein a back end processing unit include a parameter optimization module, and the back end processing unit observes end-end errors patterns in the dynamic system to update the encoder/decoder parameters of the encoder neural network and the decoder neural network, in order to minimize the end-end errors, and wherein the parameter optimization module coupled to the encoder block and the decoder block transmits the encoder/decoder parameter updates to the encoder block and the decoder block.

2. The method of claim 1, wherein the encoder/decoder parameters are utilized by at least one of the encoder neural network and the decoder neural network to dynamically upgrade or dynamically modify at least one of the encoder block and the decoder block.

3. The method of claim 1, wherein the encoder/decoder parameters are optimized to respond to detected changes in the dynamic system.

4. The method of claim 1, wherein by transmitting the encoder/decoder parameter updates to the encoder neural network, the encoder neural network can be optimized to calculate a forward error correcting code.

5. The method of claim 1, wherein the encoder/decoder parameters are capable of being modified on an on-going basis based on monitoring of a connection quality of data transmission.

6. The method of claim 1, wherein at least one of the encoder neural network and the decoder neural network is a fully connected neural network.

7. The method of claim 1, wherein at least one of the encoder neural network and the decoder neural network is a recurrent neural network.

8. The method of claim 1, wherein in order to communicate with a telecommunications device, the dynamic system can be utilized to mimic static codes that the telecommunications device can receive and understand.

9. A method for utilizing dynamic codes in a dynamic system comprising neural networks, the method comprising:
   transmitting training data, the training data comprising a known sequence of bits, to an encoder block, the encoder block having an encoder neural network;
   encoding the training data utilizing the encoder neural network of the encoder block;
   decoding the training data by a decoder block, the decoder block having a decoder neural network;
   determine an end-end error by comparing the training data that was transmitted to the encoder block against the decoded training data that was received from the decoder block;
   optimizing encoder/decoder parameters to minimize the end-end error;
   transmitting encoder/decoder parameter updates to the encoder neural network and decoder neural network of the encoder block and the decoder block, respectively; and
   upon receipt of the encoder/decoder parameter updates, dynamically initializing the encoder block and the decoder block, wherein the dynamic system can be used in a multi-turn mode, where every turn of the multi-turn communications uses a different set of encoder/decoder parameters that have been optimized for optimal overall energy efficiency.

10. The method of claim 1, wherein the dynamic system is used for at least one of wired and wireless communications.

11. The method of claim 9, wherein the encoder/decoder parameters are capable of being modified on an on-going basis based on monitoring of a connection quality of data transmission.

12. The method of claim 9, wherein in order to communicate with a telecommunications device, the dynamic system can be utilized to mimic static codes that the telecommunications device can receive and understand.

13. A dynamic system for utilizing dynamic codes, the system comprising:
   an encoder block comprising an encoder neural network;
   a decoder block comprising a decoder neural network; and
   a back end processing unit, the back end processing unit comprising:
   a processor; and
   a memory for storing instructions, the processor executing the instructions stored in memory to:
      transmit training data, the training data comprising a known sequence of bits, to an encoder block, such that the encoder block encodes the training data utilizing the encoder neural network and the training data is decoded by a decoder block utilizing the decoder neural network;
      determine an end-end error by comparing the training data that was transmitted to the encoder block against the decoded training data that was received from the decoder block;
      optimize encoder/decoder parameters to minimize the end-end error;
      transmit encoder/decoder parameter updates to the encoder neural network and decoder neural network of the encoder block and the decoder block, respectively; and
      upon receipt of the encoder/decoder parameter updates by the encoder neural network and decoder neural network, dynamically initialize the encoder block and the decoder block, wherein the back end processing unit includes the parameter optimization module, and the back end processing unit observes end-end errors patterns in the dynamic system to update the encoder/decoder parameters of the encoder neural network and the decoder neural network, in order to minimize the end-end errors.

14. The dynamic system of claim 13, wherein the encoder/decoder parameters are utilized by at least one of the encoder neural network and the decoder neural network to dynamically upgrade or dynamically modify at least one of the encoder block and the decoder block.

15. The dynamic system of claim 13, wherein the encoder/decoder parameters are optimized to respond to detected changes in the dynamic system.

16. The dynamic system of claim 13, wherein by transmitting encoder/decoder parameter updates to the encoder neural network, the encoder neural network can be optimized to calculate a forward error correcting code.

17. The dynamic system of claim 13, wherein a parameter optimization module coupled to the encoder block and the decoder block transmits the parameter updates to the encoder block and the decoder block.

18. The dynamic system of claim 13, wherein the encoder/decoder parameters can be modified on an on-going basis by monitoring a connection quality of data transmission.

19. The dynamic system of claim 13, wherein at least one of the encoder neural network and the decoder neural network is a fully connected neural network.

20. The dynamic system of claim 13, wherein at least one of the encoder neural network and the decoder neural network is a recurrent neural network.

21. The dynamic system of claim 13, wherein in order to communicate with a telecommunications device, the dynamic system can be utilized to mimic static codes that the telecommunications device can receive and understand.

22. The dynamic system of claim 13, wherein the dynamic system is used for at least one of wired and wireless communications.

23. A dynamic system for utilizing dynamic codes, the system comprising:
   an encoder block comprising an encoder neural network;
   a decoder block comprising a decoder neural network; and
   a back end processing unit, the back end processing unit comprising:
   a processor; and
   a memory for storing instructions, the processor executing the instructions stored in memory to:

transmit training data, the training data comprising a known sequence of bits, to the encoder block, such that the encoder block encodes the training data utilizing the encoder neural network and the training data is decoded by the decoder block utilizing the decoder neural network;

determine an end-end error by comparing the training data that was transmitted to the encoder block against the decoded training data that was received from the decoder block;

optimize encoder/decoder parameters to minimize the end-end error;

transmit encoder/decoder parameter updates to the encoder neural network and decoder neural network of the encoder block and the decoder block, respectively; and upon receipt of the encoder/decoder parameter updates by the encoder neural network and decoder neural network, dynamically initialize the encoder block and the decoder block, wherein the dynamic system can be used in a multi-turn mode, where every turn of the multi-turn communications uses a different set of encoder/decoder parameters that have been optimized for optimal overall energy efficiency.

24. The dynamic system of claim 23, wherein the encoder/decoder parameters are utilized by at least one of the encoder neural network and the decoder neural network to dynamically upgrade or dynamically modify at least one of the encoder block and the decoder block.

25. The dynamic system of claim 23, wherein by transmitting encoder/decoder parameter updates to the encoder neural network, the encoder neural network can be optimized to calculate a forward error correcting code.

* * * * *